(12) United States Patent
Willcocks et al.

(10) Patent No.: US 9,191,104 B2
(45) Date of Patent: Nov. 17, 2015

(54) DIRECT REFERENCE SUBTRACTION SYSTEM FOR CONTROL OF OPTICAL TRANSMITTERS

(71) Applicant: Maxim Integrated Products, Inc., San Jose, CA (US)

(72) Inventors: Benjamin A. Willcocks, Bristol (GB); Miguel Valencia, Bristol (GB); Sayed A. Madni, Oxford (GB)

(73) Assignee: Maxim Integrated Products, Inc., San Jose, CA (US)

( * ) Notice: Subject to any disclaimer, the term of this patent is extended or adjusted under 35 U.S.C. 154(b) by 116 days.

(21) Appl. No.: 14/028,616

(22) Filed: Sep. 17, 2013

(65) Prior Publication Data
US 2014/0376906 A1   Dec. 25, 2014

Related U.S. Application Data

(60) Provisional application No. 61/838,979, filed on Jun. 25, 2013.

(51) Int. Cl.
*H04B 10/079* (2013.01)
(52) U.S. Cl.
CPC .................................. *H04B 10/0799* (2013.01)
(58) Field of Classification Search
CPC .................................................. H04B 10/0779
USPC ............................................................ 398/16
See application file for complete search history.

(56) References Cited

U.S. PATENT DOCUMENTS

| 5,991,059 A | * | 11/1999 | Severn | ............................. | 398/16 |
| 8,238,395 B2 | * | 8/2012 | Wang et al. | ................. | 372/38.01 |
| 2012/0133345 A1 | * | 5/2012 | Tai et al. | ........................ | 323/282 |

* cited by examiner

*Primary Examiner* — David Payne
*Assistant Examiner* — Omar S Ismail
(74) *Attorney, Agent, or Firm* — Advent, LLP

(57) ABSTRACT

An optical measurement system configured to determine whether an optical transmitter signal requires calibration is disclosed. In an implementation, the system includes an optical transmitter configured to emit electromagnetic radiation in limited spectrums of wavelengths at amplitudes based upon one or more transmission signals, and an optical sensor configured to detect the electromagnetic radiation in the limited spectrums of wavelengths and to generate a signal in response thereto. The system includes reference current sources configured to generate a respective reference current and a switch configured to transition between a first configuration and a second configuration based upon the transmission signals. The reference currents are configured to subtract from the signal generated by the optical sensor such that a difference remains. A comparison device is configured to compare the difference portion to a reference signal and output a signal indicative of the direction in which an optical transmitter driver signal should be adjusted.

20 Claims, 1 Drawing Sheet

DIRECT REFERENCE SUBTRACTION SYSTEM FOR CONTROL OF OPTICAL TRANSMITTERS

CROSS-REFERENCE TO RELATED APPLICATIONS

The present application claims the benefit under 35 U.S.C. §119(e) of U.S. Provisional Application Ser. No. 61/838,979, entitled DIRECT REFERENCE SUBTRACTION SYSTEM FOR CONTROL OF OPTICAL TRANSMITTERS, filed on Jun. 25, 2013. U.S. Provisional Application Ser. No. 61/838,979 is herein incorporated by reference in its entirety.

BACKGROUND

Optical communication networks include optical transmitters configured to emit, or generate, signals representing data to be transmitted. For example, optical transmitters may be utilized within a passive optical network to provide reliable and efficient data transmission of video, audio, images, text multimedia, and so forth, via optical fibers. Data from an optical line terminal is transmitted via an optical fiber and is shared among multiple optical network terminals located proximate to an end-user location.

SUMMARY

An optical measurement system configured to determine whether an optical transmitter signal requires adjustment, or calibration, is disclosed. In one or more implementations, the system includes an optical transmitter configured to emit electromagnetic radiation in limited spectrums of wavelengths based upon one or more transmission signals and an optical sensor configured to detect the electromagnetic radiation in the limited spectrums of wavelengths and to generate a signal in response thereto. The system includes reference current sources that are configured to generate a respective reference current and a switch configured to transition between the current sources based upon the transmission signals. The reference currents are subtracted from the signal generated by the optical sensor such that a difference signal remains. A comparison device is configured to measure the difference signal and output a signal indicative of an adjustment for the optical transmitter drive signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Optical transmission signal characteristics, such as laser signal characteristics, vary over temperature. In some implementations, a transmit optical sub-assembly (TOSA) may incorporate a monitor optical transmission sensor. For example, the monitor optical transmission sensor may comprise a photodiode. The monitor sensor is used to measure the transmitted optical signal to allow a control loop to adjust a current (e.g., increase an amount of current or decrease an amount of current) utilized to drive an optical transmitter to maintain the desired optical signal power.

In some implementations, the transmitted optical signal may represent binary values. In these circumstances, there is interest in independently measuring and controlling the optical levels representing logical zero and logical one values. Optical transmission sensors, such as photodiodes, are inherently capacitive. This inherent capacitance combined with the input impedance of the measuring circuit forms a low-pass filter limiting the bandwidth that may be achieved. When the bandwidth is significantly lower than the signaling rate, the estimates of the logical zero and one levels vary unacceptably according to the transmitted data and according to changes in bandwidth that may occur over temperature.

Accordingly, an optical measurement system configured to determine whether an optical transmitter signal requires adjustment is disclosed. The optical measurement system is also configured to be insensitive to changes in photodiode capacitance over a range of temperatures, or from one device to another. In one or more implementations, the system includes an optical transmitter configured to emit electromagnetic radiation in limited spectrums of wavelengths based upon one or more transmission signals and an optical sensor configured to detect the electromagnetic radiation in the limited spectrums of wavelengths and to generate a signal in response thereto. In a specific implementation, the optical transmitter is a laser diode, and the optical sensor is a photodiode. The system includes reference current sources that are configured to generate a respective reference current and a switch configured to transition between the reference currents based upon the transmission signals. The reference currents are subtracted from the signal generated by the optical sensor such that a difference signal remains. A comparison device is configured to measure the difference signal and output a signal indicative of the direction in which the optical transmitter driver signal should be adjusted. In other words, the signal is indicative of whether the optical transmitter driver signal should be increased or decreased to maintain the desired optical signal power.

Example Implementations

Figure 1:
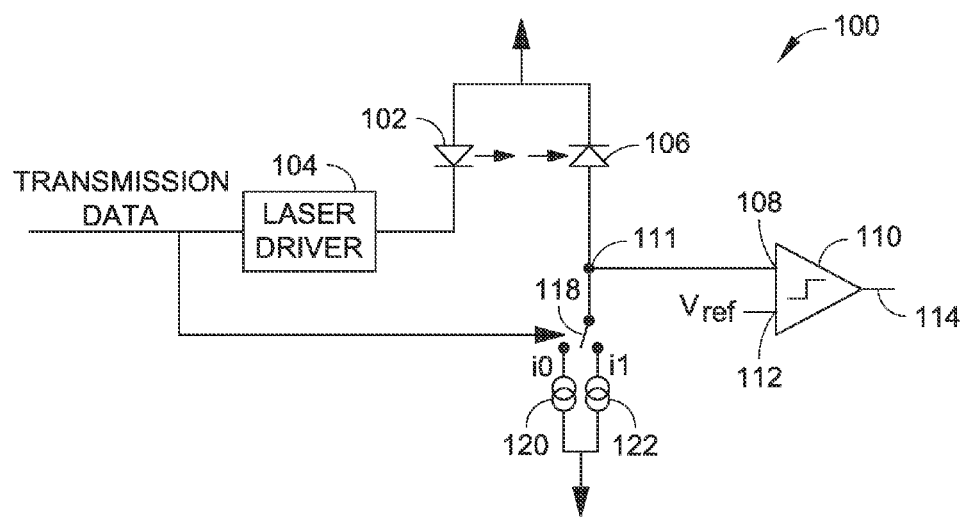
FIG. 1 is a circuit diagram illustrating an optical measurement system in accordance with an example implementation of the present disclosure.
Figure 2:
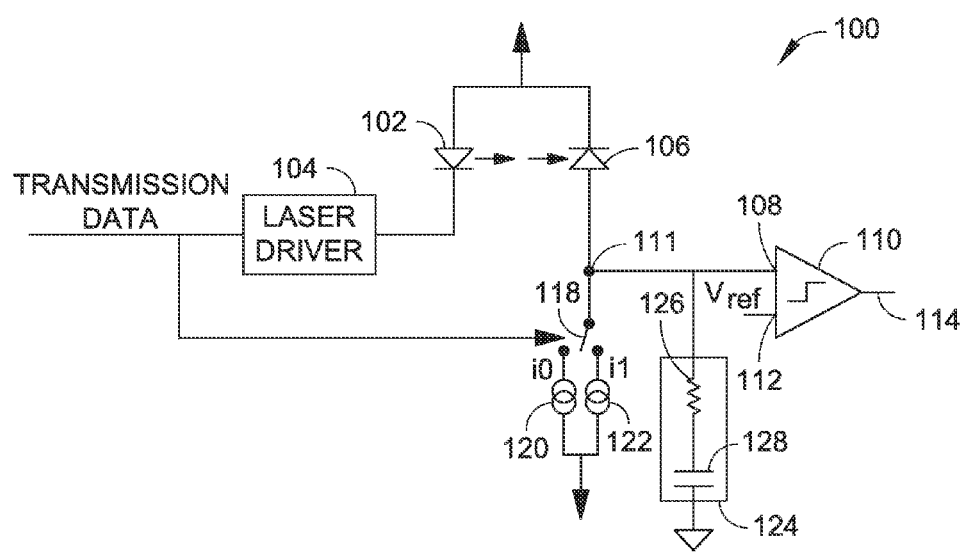
FIG. 2 is a circuit diagram illustrating an optical measurement system in accordance with another example implementation of the present disclosure.

FIGS. 1 and 2 illustrate optical measurement systems 100 in accordance with example implementations of the present disclosure. As shown, the system 100 includes an optical transmitter 102 operatively connected to an optical transmission driver 104. The optical transmitter 102 is configured to emit electromagnetic radiation at an amplitude (i.e., electromagnetic radiation having one or more amplitude characteristics) based upon (e.g., determined) by one or more signals generated by the optical transmission driver 104. In an example implementation, the optical transmitter 102 is a laser diode, or the like, and the optical transmission driver 104 is a laser diode driver, or the like. For example, the transmission data may comprise binary characteristics. The system 100 may be utilized as part of a calibration system within an optical transmission system. For instance, the system 100 may be utilized as part of a control loop to monitor and to control signals transmitted by the transmitter 102 (e.g., to compensate for variations in the transmitter's characteristics over temperature, maintaining consistent optical signal levels).

The system 100 also includes an optical sensor 106 configured to detect electromagnetic radiation emitted by the optical transmitter 102 and convert the electromagnetic radiation into an electrical signal. For example, the electrical signal may represent the amplitude characteristics of the electromagnetic radiation. In one or more implementations, the optical sensor 106 comprises photodetectors, such as photodiodes, phototransistors, or the like, that convert received electromagnetic radiation in the limited spectrum of wavelengths emitted by the optical transmitter 102 into an electrical current. The optical sensor 106 is connected to a first input 108 of a comparison device 110 at a node 111. The second input 112 of the comparison device 110 is connected to a reference voltage. In an example implementation, the comparison device 110 comprises a comparator, such as an operational amplifier comparator. The comparison device 110 is configured to output a first signal (e.g., a voltage signal, a current signal) at an output 114 of the device 110 when the voltage at the first input 108 is greater than the reference voltage and configured to output a second signal at the output 114 when the voltage at the first input 108 is less than the reference voltage.

The switch 118 is configured to switch between a number of reference current sources according to the transmit data. While only two reference sources 120, 122 are illustrated, it is understood that the system 100 may be utilized within a multi-level signaling scheme. For example, while only a binary implementation is illustrated, the system 100 may be utilized with three or more reference current sources that the switch 118 is configured to switch between. In an example implementation using binary signaling, the switch 118 switches between a first reference current source 120 (when the transmit data represents a logical "0") and a second reference current source 122 (when the transmit data represents a logical "1"). The reference current sources 120, 122 are configured to generate a respective reference current to subtract the respective reference current at the node 111. For example, the first reference current source 120 is configured to generate a current representative of a current representing a logical high, and the second reference current source 122 is configured to generate a current representative of a current representing a logical low, or vice versa. The switch 118 transitions between a first switch configuration and a second switch configuration based upon the transmission data input. When the transmission data input represents a logical low, the reference current source 120, 122 generating a current representing the logical low is electrically connected to the node 111, and when the transmission data input at the device 116 represents a logical high, the reference current source 120, 122 generating a current representing the logical high is electrically connected to the node 111. In other words, the reference current sources 120, 122 are configured to generate a respective current representing the desired optical sensor 106 signals. In some implementations of the present disclosure, multiple current sources may be connected to the node 111 during a discrete time period. For example, the reference current source 120 may be directly connected to the node 111. Based upon the transmission data, the switch 118 is configured to connect the reference current source 122 to the node 111, which results in the reference current source 120 and the reference current source 122 to be simultaneously connected to the node 111 during the discrete time period.

Thus, when the optical transmitter 102 is emitting electromagnetic radiation indicative of a logical low signal, the optical sensor 106 is configured to detect the radiation and generate a signal indicative of the logical low signal. The device 116 also receives the transmission data representing the logical low signal and causes the switch 118 to switch to the switch configuration such that the respective reference current source 120, 122 generating a current representing the current (i.e., current level) of the logical low signal is electrically connected to the node 111. The current generated by the respective reference current source 120, 122 is subtracted from the current generated by the optical sensor 106 at the node 111. When the optical transmitter 102 is emitting electromagnetic radiation indicative of a logical high signal, the optical sensor 106 is configured to detect the radiation and generate a signal indicative of the logical high signal. The device 116 also receives the transmission data representing the logical high signal and causes the switch 118 to switch to the switch configuration such that the other reference current source 120, 122 generating a reference current representing the current (i.e., current level) of the logical high signal is electrically connected to the node 111. The reference current generated by the respective reference current source 120, 122 is subtracted from the current generated by the optical sensor 106 at the node 111. In other words, the reference current subtracts, or removes, the desired current signal portion generated by the optical sensor 106. Thus, the remaining signal portion (i.e., the un-subtracted portion of the signal) represents the difference between the signal generated by the optical sensor 106 and the reference current. This difference may be due to, but is not limited to, changes in the temperature of the transmitter 102, or the like. The reference current generated by the respective reference current source 120, 122 experiences the same bandwidth limitations as the optical sensor 106 since the reference current is applied to the same node 111, making the measurement insensitive to changes in bandwidth.

As described above, the comparison device 110 is configured to output a first signal (e.g., a discrete high signal, such as a logical high signal) when the difference signal portion at the first input 108 is greater than the reference signal at the second input 112. The first signal may be utilized to adjust the optical transmitter 102 and/or the optical transmission driver 104 to maintain a desired optical signal power. For example, the first signal may indicate that the current furnished to the optical transmitter 102 should be reduced in order to maintain a desired optical signal power. The comparison device 110 is also configured to output a second signal (e.g., a discrete low signal, such as a logical low signal) when the difference signal portion at the first input 108 is less than (or equal to) the reference signal at the second input 112. The second signal may indicate that the current furnished to the optical transmitter 102 should be increased in order to maintain a desired optical signal power. It is contemplated that the indication of whether the current should be increased or decreased may be referred to as changing the direction of the signal with respect to the present disclosure.

As shown in FIG. 2, the system 100 may include a filter 124 electrically connected to the node 111. As shown, the filter 124 includes at least one resistor 126 and at least one capacitor 128 connected in series between the node 111 and circuit ground. The filter 124 is configured to at least partially cause decay of an unwanted signal, or signals. For example, there may be some discrepancies between the current generated by the optical sensor 106 and the corresponding reference current due to undesirable crosstalk between the optical transmitter 102 and the optical sensor 106. The filter 124 utilizes capacitive coupling, or AC coupling, to preserve the system's 100 insensitivity to the comparison device's 110 input offset voltage. It is contemplated that the RC time constant should be selected such that the voltage at the capacitor 128 does not vary significantly according to the transmitted data.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An optical measurement system comprising:
    an optical transmitter configured to emit electromagnetic radiation;
    an optical sensor configured to detect the electromagnetic radiation and to generate an optical sensor signal in response thereto, the optical sensor signal representing the electromagnetic radiation;
    a plurality of reference current sources, each reference current source of the plurality of reference current sources configured to generate a respective reference current;
    a switch configured to electrically connect the optical sensor to at least one reference current source of the plurality of reference current sources at a time, the at least one reference current source selected according to the transmission signal such that the reference current generated by the at least one reference current source is subtracted from the optical sensor signal such that a difference signal remains, the difference signal representing a temperature characteristic associated with the optical transmitter; and
    a comparison device electrically coupled to the optical sensor, the comparison device configured to compare the difference signal to a reference signal, the comparison device configured to output a comparison output signal indicative of an adjustment for a optical transmitter drive signal that drives the optical transmitter based upon the transmission signal.

2. The optical measurement system as recited in claim 1, wherein the optical transmitter comprises a laser diode.

3. The optical measurement system as recited in claim 1, further comprising an optical transmitter driver operatively coupled to the optical transmitter, the optical transmitter driver configured to generate the optical transmitter drive signal to drive the optical transmitter, the optical transmitter drive signal based upon transmission data.

4. The optical measurement system as recited in claim 1, wherein the comparison device comprises a comparator.

5. The optical measurement system as recited in claim 1, wherein the optical sensor comprises a photodetector.

6. The optical measurement system as recited in claim 1, wherein the first logical data characteristic represents a logical high signal and the second logical characteristic represents a logical low signal.

7. The optical measurement system as recited in claim 1, further comprising a filter electrically coupled to the comparison device, the filter configured to at least partially decay an unwanted portion of a signal.

8. The optical measurement system as recited in claim 7, wherein the filter comprises a resistor-capacitor circuit element.

9. The optical measurement system as recited in claim 1, further comprising a reference current source directly connected to the optical sensor.

10. An optical measurement system comprising:
    an optical sensor configured to detect an electromagnetic radiation and to generate an optical sensor signal in response thereto, the electromagnetic radiation based upon an optical transmitter drive signal;
    a first reference current source configured to generate a first reference current;
    a second reference current source configured to generate a second reference current;
    a switch having a first switch configuration based upon the optical transmitter drive signal to electrically connect the optical sensor to the first reference current source at a node to subtract the first reference current from the optical sensor signal such that a first signal difference portion remains and a second switch configuration based upon the optical transmitter drive signal to electrically connect the optical sensor to the second reference current source at the node to subtract the second reference current from the optical sensor signal such that a second signal difference portion remains, at least one of the first signal difference portion or the second signal difference portion representing a temperature characteristic of the optical transmitter drive signal; and
    a comparison device directly coupled to the node, the comparison device configured to compare at least one of the first signal difference portion or the second signal difference portion to a reference signal, the comparison device configured to output a first comparison output signal when the at least one of the first signal difference portion or the second signal difference portion is greater than the reference signal and configured to output a second comparison output signal when the at least one of the first difference portion or the second difference portion is less than or equal to the reference signal, the first comparison output signal indicative that the optical transmitter drive signal should be reduced to maintain a desired optical signal power and the second comparison output signal indicative that the optical transmitter drive signal should be increased to maintain the desired optical signal power.

11. The optical measurement system as recited in claim 10, wherein the optical transmitter comprises a laser diode.

12. The optical measurement system as recited in claim 10, wherein the comparison device comprises a comparator.

13. The optical measurement system as recited in claim 10, wherein the optical sensor comprises a photodetector.

14. The optical measurement system as recited in claim 10, wherein the first transmission data characteristic represents a logical high signal and the second transmission data characteristic represents a logical low signal.

15. The optical measurement system as recited in claim 10, further comprising a filter electrically coupled to the node, the filter configured to at least partially decay an unwanted portion of a signal.

16. The optical measurement system as recited in claim 15, wherein the filter comprises a resistor-capacitor circuit element.

17. An optical measurement system comprising:
    a laser diode configured to emit electromagnetic radiation;
    a photodetector configured to detect the electromagnetic radiation in the limited spectrum of wavelengths and to generate a photodetector signal in response thereto, the photodetector signal representing the electromagnetic radiation;

a plurality of reference current sources, each reference current source of the plurality of reference current sources configured to generate a respective reference current;

a switch configured to electrically connect the photodetector to at least one reference current source of the plurality of reference current sources at a time, the at least one reference current source selected according to the transmission signal such that the reference current generated by the at least one reference current source is subtracted from the photodetector signal such that a difference signal remains, the difference signal representing a temperature characteristic associated with the laser diode; and a comparison device directly coupled to the photodetector, the comparison device configured to compare the difference signal to a reference signal, the comparison device configured to output a comparison output signal indicative of an adjustment for a laser diode drive signal that drives the laser diode based upon the transmission signal.

18. The optical measurement system as recited in claim 17, further comprising a laser driver operatively coupled to the laser diode, the laser driver configured to generate the laser drive signal to drive the laser diode.

19. The optical measurement system as recited in claim 17, wherein the comparison device comprises a comparator.

20. The optical measurement system as recited in claim 17, further comprising a filter electrically coupled to the node, the filter configured to at least partially decay an unwanted portion of a signal.

* * * * *